United States Patent
Adams et al.

(10) Patent No.: US 7,526,786 B1
(45) Date of Patent: Apr. 28, 2009

(54) CONTENT PROGRAMMER CONTROL OF VIDEO AND DATA DISPLAY USING ASSOCIATED DATA

(75) Inventors: Robert Adams, Lake Oswego, OR (US); David M. Williams, Portland, OR (US); John Richardson, Portland, OR (US); Burt Perry, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 2143 days.

(21) Appl. No.: 09/595,783

(22) Filed: Jun. 16, 2000

Related U.S. Application Data

(63) Continuation of application No. 08/982,223, filed on Dec. 17, 1997, now Pat. No. 6,108,042, which is a continuation of application No. 08/862,329, filed on May 23, 1997, now Pat. No. 5,760,838, which is a continuation of application No. 08/665,514, filed on Jun. 18, 1996, now abandoned, which is a continuation of application No. 08/316,503, filed on Sep. 30, 1994, now Pat. No. 5,541,662.

(51) Int. Cl.
*G06F 13/00* (2006.01)
*G06F 3/00* (2006.01)
*H04N 5/445* (2006.01)
*H04N 7/16* (2006.01)

(52) U.S. Cl. .............. 725/54; 725/39; 725/44; 725/136

(58) Field of Classification Search .......... 725/136, 725/37, 39, 54, 44
See application file for complete search history.

(56) References Cited

U.S. PATENT DOCUMENTS

| | | | | |
|---|---|---|---|---|
| 4,862,268 A | * | 8/1989 | Campbell et al. | 348/463 |
| 4,962,428 A | | 10/1990 | Tong et al. | 358/188 |
| 4,977,455 A | | 12/1990 | Young | 358/142 |
| 5,210,611 A | | 5/1993 | Yee et al. | 358/191.1 |
| 5,260,788 A | | 11/1993 | Takano et al. | 358/142 |
| 5,274,753 A | | 12/1993 | Roskowski et al. | 395/135 |
| 5,311,311 A | | 5/1994 | Harigai et al. | |
| 5,351,129 A | | 9/1994 | Lai | |

(Continued)

FOREIGN PATENT DOCUMENTS

EP 0 617 556 A1 3/1993

(Continued)

OTHER PUBLICATIONS

EPO Search Report, Appln No. EP00127514, dated Feb. 9, 2001, 3 pages.

*Primary Examiner*—Hunter B. Lonsberry
(74) *Attorney, Agent, or Firm*—Blakely, Sokoloff, Taylor & Zafman LLP

(57) ABSTRACT

An interactive video system is disclosed that processes a video data stream and an associated data stream corresponding to the video data stream. The interactive video system displays a video image defined by the video data stream on a display device and performs interactive command functions specified by the associated data stream. The interactive command functions include commands that specify placement of a video display window, commands that specify parameters of graphical objects that are associated with the video image and commands that specify pixel data or graphics description for the graphical object and commands for placement of selection windows and that specify interactive functions for the selection windows.

18 Claims, 8 Drawing Sheets

U.S. PATENT DOCUMENTS

| | | | |
|---|---|---|---|
| 5,353,121 A | 10/1994 | Young et al. | 348/563 |
| 5,359,367 A | 10/1994 | Stockill | 348/552 |
| 5,390,027 A | 2/1995 | Henmi et al. | 358/335 |
| 5,402,187 A | 3/1995 | Ezaki | 348/474 |
| 5,404,393 A | 4/1995 | Remillard | 379/96 |
| 5,420,923 A | 5/1995 | Beyers, II et al. | 380/20 |
| 5,450,134 A | 9/1995 | Legate | 348/467 |
| 5,459,522 A | 10/1995 | Pint | 348/478 |
| 5,477,274 A | 12/1995 | Akiyoshi et al. | 348/468 |
| 5,512,935 A * | 4/1996 | Majeti et al. | 725/33 |
| 5,532,753 A | 7/1996 | Buchner et al. | 348/569 |
| 5,537,151 A | 7/1996 | Orr et al. | 348/564 |
| 5,541,662 A | 7/1996 | Adams et al. | 348/460 |
| 5,561,471 A | 10/1996 | Kim et al. | 348/565 |
| 5,654,743 A | 8/1997 | Hu et al. | 345/213 |
| 5,686,954 A | 11/1997 | Yoshinobu et al. | 348/13 |
| 5,751,335 A | 5/1998 | Shintani | 348/5.5 |
| 5,760,838 A | 6/1998 | Adams et al. | 348/460 |
| 5,761,606 A | 6/1998 | Wolzien | 455/6.2 |
| 5,768,426 A | 6/1998 | Rhoads | 382/232 |
| 5,790,198 A | 8/1998 | Roop et al. | 348/460 |
| 5,850,218 A | 12/1998 | LaJoie et al. | 348/13 |
| 5,859,662 A | 1/1999 | Cragun et al. | 348/13 |
| 5,991,799 A * | 11/1999 | Yen et al. | 709/218 |
| 6,128,653 A * | 10/2000 | del Val et al. | 709/219 |
| 6,173,317 B1 * | 1/2001 | Chaddha et al. | 709/219 |

FOREIGN PATENT DOCUMENTS

| | | |
|---|---|---|
| WO | 9005350 | 11/1988 |
| WO | WO 94/13107 | 12/1992 |
| WO | WO 94/17633 | 1/1994 |

* cited by examiner

CONTENT PROGRAMMER CONTROL OF VIDEO AND DATA DISPLAY USING ASSOCIATED DATA

This application is a continuation of application Ser. No. 08/982,223 filed Dec. 17, 1997, U.S. Pat. No. 6,108,042, which is a continuation of application Ser. No. 08/862,329 filed May 23, 1997, U.S. Pat. No. 5,760,838, which is a continuation of application Ser. No. 08/665,514 filed Jun. 18, 1996, abandoned, which is a continuation of application Ser. No. 08/316,503 filed Sep. 30, 1994, U.S. Pat. No. 5,541,662.

BACKGROUND OF THE INVENTION

1. Field of the Invention

The present invention pertains to the field of computer systems. More particularly, this invention relates to the coordination of video and audio data streams using associated data streams to enable content programmer control of display and selection functions for a video system.

2. Background

In prior television systems, a video content programmer typically controls the entire video display screen by selecting the video programming, the presentation of the video programming, and the programming flow. Typically, such a content programmer maintains total control over the coloring, the style, and the presentation of images on the video display screen.

In contrast, the presentation of video on a computer system is typically limited by an operating system's styles and conventions. A typical operating system for a computer system imposes a particular display style that confine programs executed on the computer system. In the case of video windows on such a computer system, a content programmer is usually limited to the standard look of the particular operating system and may not vary too far from the standard look.

However, as such computer systems become more commonly used for the presentation of consumer items, content programmers may seek more control over the look a feel of computer system video. Such control would enable content programmers to select a look and feel closely identified with the products being displayed. Such control would require that the content programmer control the video information as well as other elements on the video display screen including colors, logos and selection button placement. Unfortunately, such control over the look and feel of video displays on a computer system is generally unavailable to content programmers on prior television receiving systems.

Prior television receiving systems merely provide mechanisms for including data associated with an incoming video signal. Such associated data is typically received during vertical blanking intervals of the incoming video signal. In such prior systems, the functions of the associated data in relation to the incoming video signal is usually fixed according to the design of the television receiving system.

For example, some prior television receivers include a mechanism for decoding and displaying closed caption information that corresponds to the incoming video signal. In such a system, the closed caption associated data of the incoming video signal is usually decoded and displayed with video characters superimposed over the normal incoming video scene.

Other prior video receivers decode the associated data of the incoming video stream and transfer the decoded data through an input/output port of the receiver. Typically in such systems, the function of the input/output port is fixed according to a predetermined design of the receiver. Unfortunately, such systems impose fixed and inflexible functions to video content programmers where the receiving device is a computer.

In addition, some prior video receiving systems provide rudimentary interactive video functions. In such systems, selection regions of the video display are typically encoded into the incoming video signal. Such selection region information usually specifies areas of the video display that correspond to a predetermined selection function according to the content of the incoming video signal. The video receiver in such prior systems typically includes a pointing device that enables a user to position a pointer within a selection region and select the corresponding function.

Unfortunately, such prior interactive video systems provide only limited selection and control functions for interactive video such as specifying regions for picking underlying video objects. Typically, such prior systems do not enable video content programmers to exercise flexible control over an entire range of interactive video functions including the sizing and placement of video objects over the entire display.

SUMMARY AND OBJECTS OF THE INVENTION

One object of the present invention is to provide flexible content programming control in an interactive video system.

Another object of the present invention is to enable a content programmer to create a video display screen from a programming studio and to flexibly control the area around the video display including the placement of text, the definition and placement of graphical objects and to provide download information to the computer system and place buttons on the video display to select the downloaded information wherein the additional display information is in sync with the video and audio information.

Another object of the present invention is to provide an interactive video system controlled by an associated data stream corresponding to a video data stream.

Another object of the present invention is to provide an interactive video system wherein the associated data stream determines placement of a video display window on a display device.

Another object of the present invention is to provide an interactive video system wherein the associated data stream determines placement and functionality of selection regions that correspond to a video image in the video display window.

A further object of the present invention is to provide an interactive video system wherein the associated data stream determines the placement and pixel content of graphical objects on the display device that correspond to the video image.

Another object of the present invention is to provide an interactive video system that employs the vertical blanking intervals of the video frames of a video signal or chrominance, sideband, or audio sub carrier signals to transfer the associated data stream.

Another object of the present invention is to provide a video system that employs packetized digital data streams to provide a video stream, an audio stream and a command and control associated data stream.

These and other objects of the invention are provided by a video system that receives a video data stream and an associated data stream corresponding to the video data stream via a broadcast receiver, a CATV link, or a packetized digital communication link. The video system displays a video image defined by the video data stream on a display device and performs command functions specified by the associated data stream.

The command functions include commands that specify parameters that determine an area on a display surface of the display device for placement of a video display window that contains the video image. The command functions include commands that specify parameters of graphical objects that corresponds to the video image and commands that specify pixel data for the graphical objects. The command functions include commands that specify parameters for placement of selection windows that correspond to the video image and commands that specify functions performed if a user selects the selection windows.

One embodiment of the present invention is employed in a computer enhanced video shopping system. For this embodiment, a portion of a video display screen is allocated to the display of an incoming video program. The remainder of the video display screen contains information that describes items being displayed along with manufacturing logos for the items being displayed on the video display. The remainder of the video display screen includes selection regions or buttons to enable a viewer to select more detailed information regarding the items being displayed and related items for sale. In addition, the remainder of the video display contains additional text and graphics that provides information on future items for display.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
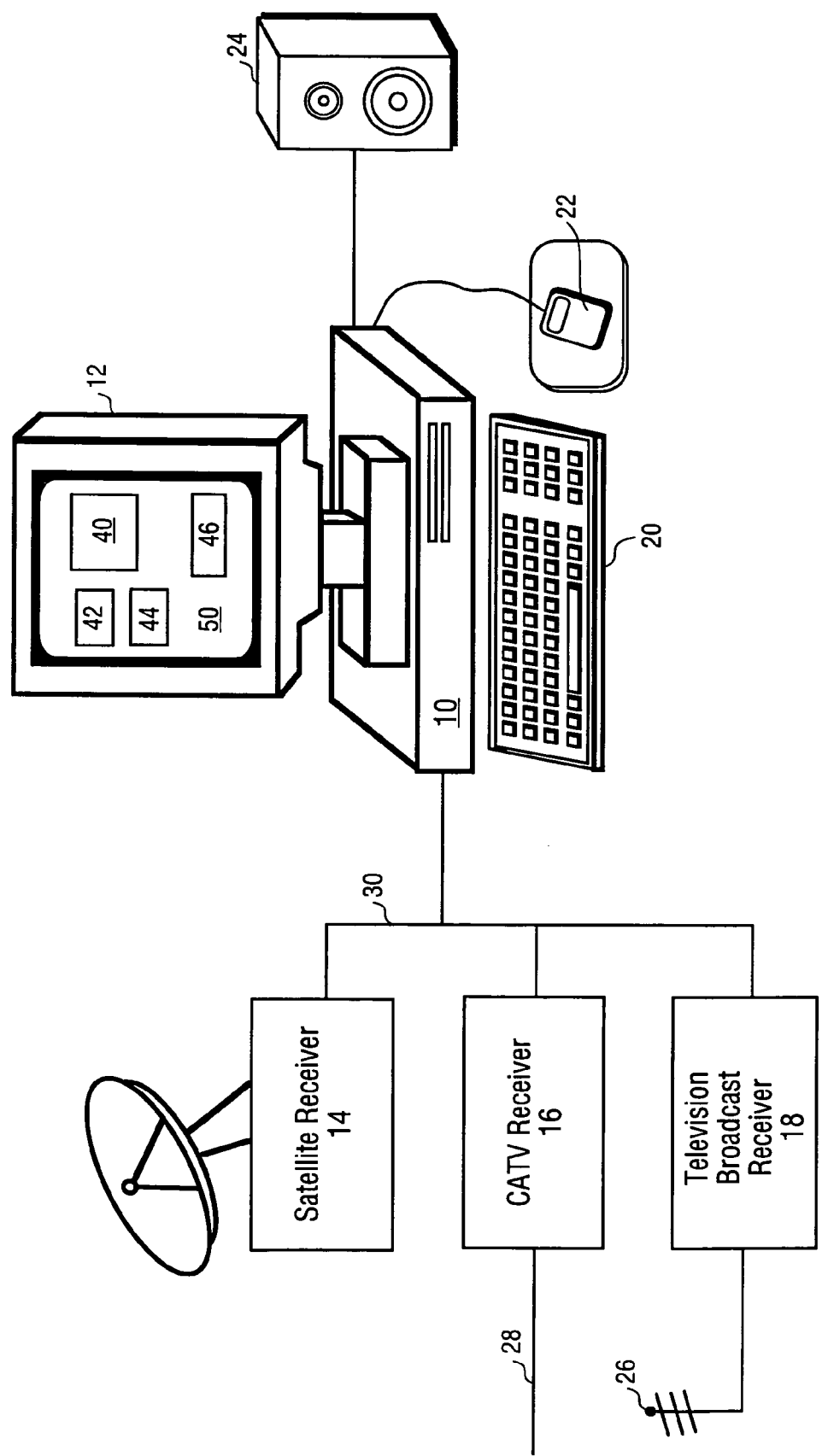
FIG. 1 illustrates an interactive video system for one embodiment that receives data streams through a satellite receiver, a cable television (CATV) receiver, or a television broadcast receiver.

FIG. 1 illustrates an interactive video system for one embodiment. The interactive video system comprises a computer system 10, along with a display device 12, a keyboard 20, a mouse pointing device 22, and a speaker 24. The interactive video system further comprises a satellite receiver 14, a cable television (CATV) receiver 16, or a television broadcast receiver 18.

The satellite receiver 14 enables reception of packetized digital data streams over a satellite link. For one embodiment, the incoming packetized digital data streams received by the satellite receiver 14 conform to the motion picture engineering group (MFEG) video transport standard. The packetized digital data streams received by the satellite receiver 14 include video data packets, audio data packets, and associated data packets. The satellite receiver 14 transfers the received digital data stream packets to the computer system 10 over a communication line 30.

The CATV receiver 16 enables reception of an analog or digital video signal over a coaxial transmission line 28. The analog video signal over the coaxial transmission line 28 comprises a CATV cable television link. The CATV receiver 16 digitizes the incoming analog video signal and transfers the corresponding digitized video signal to the computer system 10 over the communication line 30. Alternatively, the CATV receiver 16 transfers the incoming analog video signal to the computer system 10 over the communication line 30.

The television broadcast receiver 18 enables reception of an analog video signal transmitted over the air through an antenna 26. The television broadcast receiver 18 receives and demodulates the incoming broadcast analog video signal, performs analog to digital conversion on the analog video signal to generate a corresponding digital video signal. The television broadcast receiver 18 transfers the incoming digital video signal to the computer system 10 over the communication line 30.

For one embodiment, the computer system 10 receives the packetized digital data stream from the satellite receiver 14 over the communication line 30. The computer system 10 extracts the video data packets from the incoming packetized digital data stream and generates a corresponding video image in a video window 40 on a display surface 50 of the display device 12. The computer system 10 also extracts audio data packets of the incoming packetized digital data stream on the communication line 30 and generates a corresponding analog audio signal to drive the speaker 24.

The computer system 10 extracts associated data packets of the incoming packetized digital data stream on the communication line 30 and decodes the associated data packets according to a predefined video command and control protocol. The associated data packets received over the communication line 30 specify a selection region 42 on the display surface 50. The incoming associated data packets specify the position of the selection region 42 on the display surface 50. The associated data packets on the communication line 30 also specify a graphical display icon 44 for the display surface 50. In addition, the associated data packets specify the graphical content of the icon 44 as well as the positioning of the icon 44 on the display surface 50.

The incoming associated data packets received over the communication line 30 specify an information display window 46 on the display surface 50. The associated data packets specify a position for the information display window 46 and the video window 40 on the display surface 50 as well as the display content of the information display window 46.

For another embodiment, the computer system 10 receives a digitized representation of the incoming analog video signal from either the CATV receiver 16 or the television broadcast receiver 18 over the communication line 30. The incoming digitized video signal comprises a series of video frames each comprising a series of video scan intervals and a vertical blanking interval. The computer system 10 extracts the video information for the video window 40 during the video scan intervals of each received video frame over the communication line 30. The computer system 10 extracts the corresponding audio information for the speaker 24 during the video scan interval of the incoming video data frames.

In addition, the computer system 10 extracts associated data for the incoming video signal during vertical blanking intervals of the incoming video data frames. The computer system 10 decodes the extracted associated data according to the predefined video command and control protocol. The associated data specifies the parameters for the selection region 42. The associated data also specifies the position and content of the graphical display icon 44. The associated data specifies the parameters for the information display window 46 and the video window 40 as well as the display content of the information display window 46.

Figure 2:
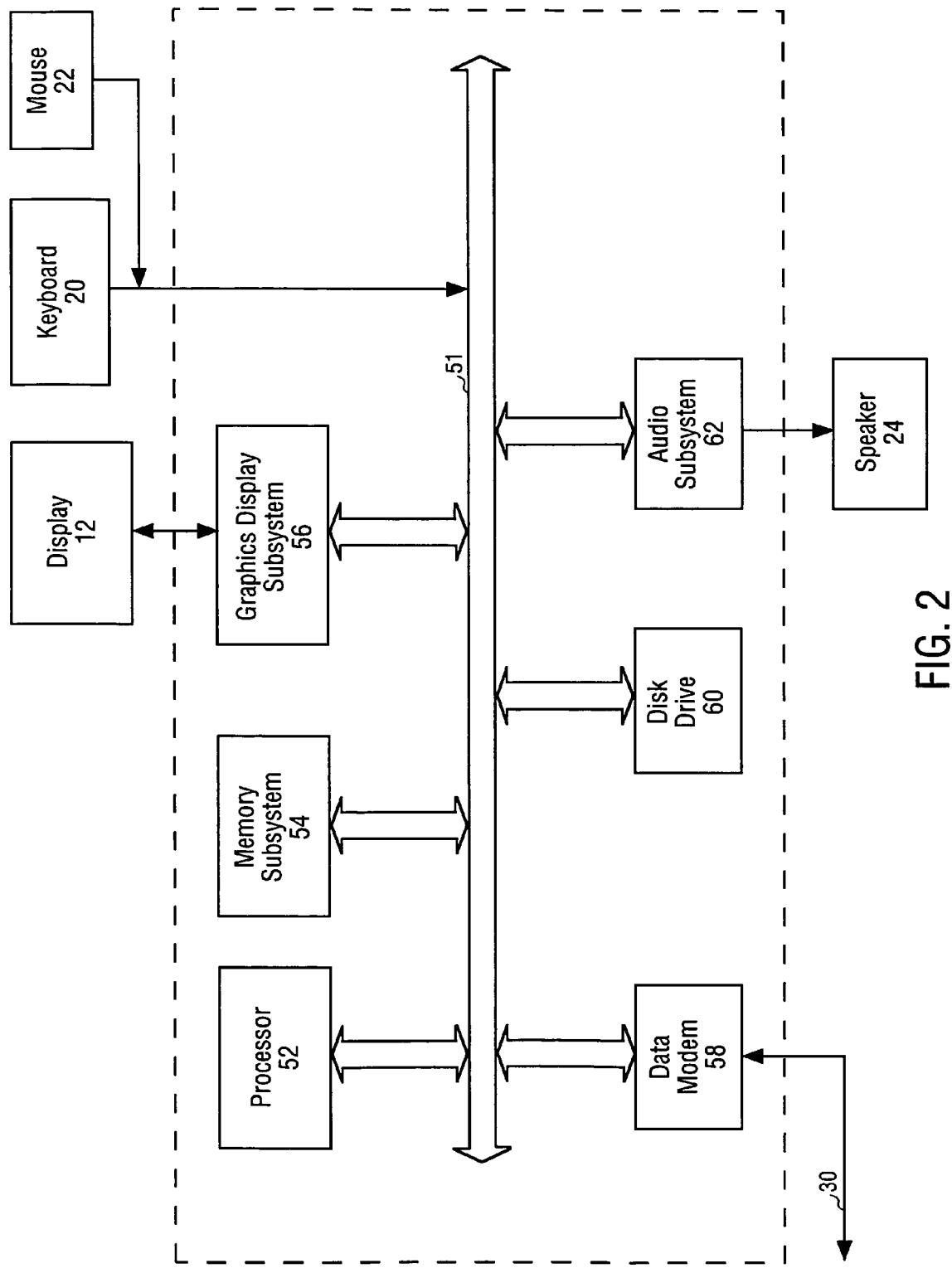
FIG. 2 illustrates a computer system for one embodiment including a graphics display subsystem that drives a display device, a data modem that receives data streams, and an audio subsystem that drives a speaker.

FIG. 2 illustrates the computer system 10 for one embodiment. The computer system 10 comprises a processor 52, a memory subsystem 54, a graphics display subsystem 56. The computer system 10 further comprises a data modem 58, a disk drive 60, an audio subsystem 62. The processor 52 communicates with the memory subsystem 54, the graphics display subsystem 56, the data modem 58, the disk drive 60, and the audio subsystem 62 via a system bus 51.

The memory subsystem 54 provides memory storage areas for an operating system, application programs, device driver programs, and associated data structures for the computer system 10. For one embodiment, the memory subsystem 54 comprises a dynamic random access memory (DRAM) subsystem. The disk drive 60 provides large scale mass storage to the computer system for programs and associated data structures.

The graphics display subsystem 56 performs graphics rendering functions and includes a frame buffer and associated circuitry to drive the display device 12. The graphics display subsystem 56 enables software executing on the processor 52 to generate display windows on the display device 12 including video display windows. The graphics display subsystem 56 also enables user selection functions from the display surface 50 to the display device 12 via the mouse pointing device 22.

The audio subsystem 62 enables software executing on the processor 52 to render audio data and includes circuitry that drives the speaker 24. The audio subsystem 62 receives digitized audio data over the system bus 51 and generates a corresponding analog audio signal to drive the speaker 24.

The data modem 58 receives incoming digital data streams over the communication line 30. For one embodiment, the digital data streams received over the communication line 30 comprise packetized digital data streams from the satellite receiver 14. For another embodiment, the digital data stream received over the communication line 30 comprises a digitized representation of the analog video signal received either by the CATV receiver 16 or the television broadcast receiver 18.

The data modem 58 enables software executing on the processor 52 to extract the video data, the audio data, and the associated data from the incoming digital data on the communication line 30. The software executing on the processor 52 thereafter distributes the video data for display on the display device 12 through the graphics display subsystem 56. The processor 52 distributes the incoming audio data to the audio subsystem 62 to drive the speaker 24. The processor 52 extracts the associated data through the data modem 58 and performs the interactive video functions specified by the associated data.

Figure 3:
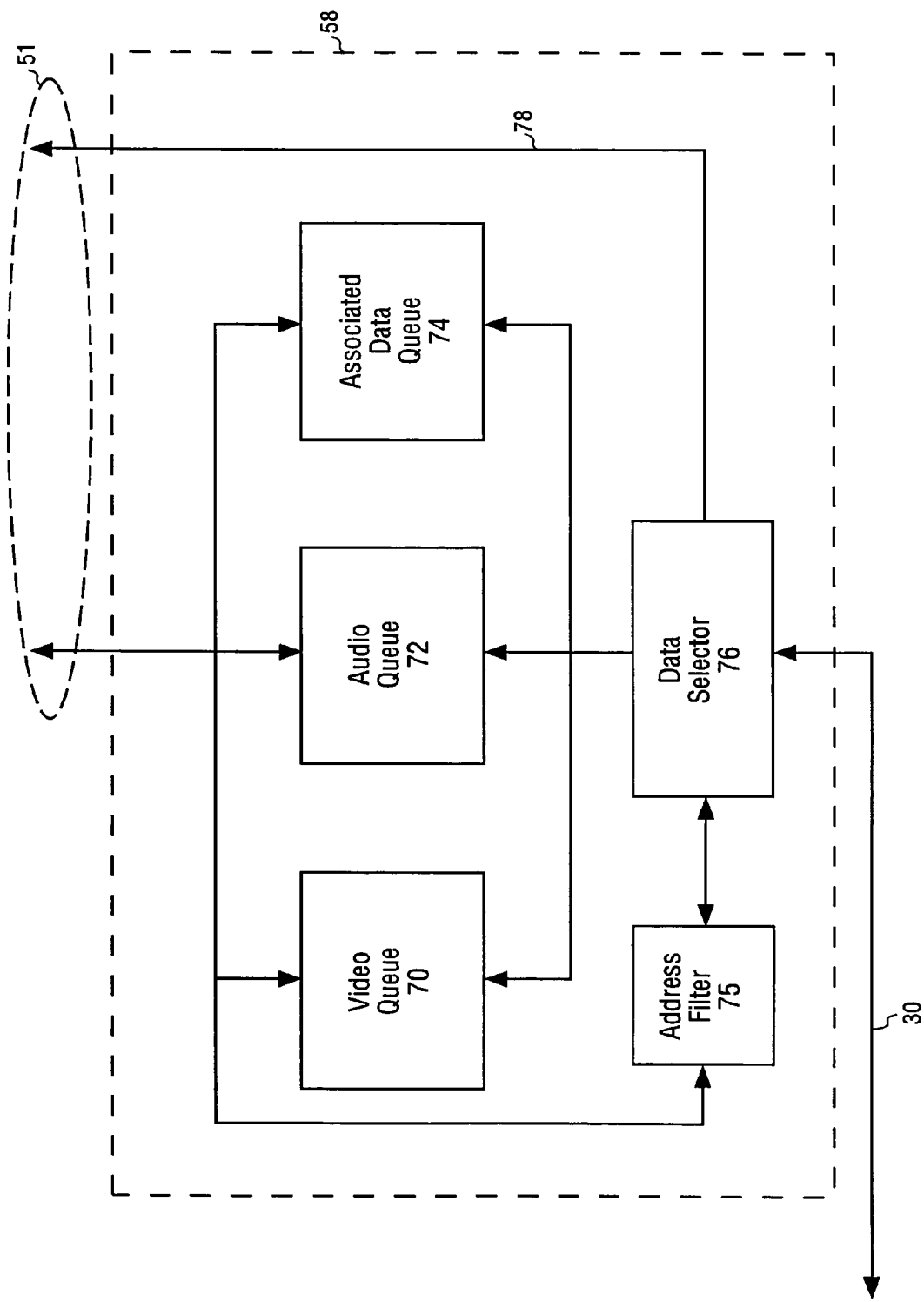
FIG. 3 illustrates the data modem for one embodiment which comprises a data selector, a video queue, an audio queue, and an associated data queue.

FIG. 3 illustrates the data modem 58 for one embodiment. The data modem 58 comprises, a data selector 76, a video queue 70, an audio queue 72, an associated data queue 74 and an address filter 75. The data selector 76 receives incoming digital data streams over the communication line 30. The data selector 76 extracts the incoming digital video data received over the communication line 30 and transfers the incoming digital video data into the video queue 70. The data selector 76 extracts the incoming digital audio data over the communication line 30 and transfers the incoming digital audio data into the audio queue 72. The data selector 76 extracts the incoming digital associated data over the communication line 30 and transfers the incoming associated data into the associated data queue 74.

For one embodiment, the data selector 76 receives packetized digital data streams over the communication line 30 from the satellite receiver 14. The data selector 76 decodes the header of each incoming packet to determine whether to transfer the incoming packet into either the video queue 70, the audio queue 72, or the associated data queue 74.

For another embodiment, the data selector 76 receives a digitized representation of an analog video signal over the communication line 30 from either the CATV receiver 16 or the television broadcast receiver 18. The data selector 76 extracts the video information from the incoming digitized video signal and assembles the video information into corresponding video packets in the video queue 70. The data selector 76 extracts the audio information from the incoming digitized video signal and assembles the audio information into corresponding audio packets in the audio queue 72. The data selector 76 extracts associated data during the vertical blanking interval of each video frame of the incoming digitized video signal on the communication line 30. The data selector 76 assembles the incoming associated data into associated data packets in the associated data queue 74.

The data selector 76 generates an interrupt to the processor 52 over an interrupt line 78 each time an incoming packet is placed in either the video queue 70, the audio queue 72, or the associated data queue 74. The interrupt to the processor 52 on the interrupt line 78 causes the processor 52 to read the incoming packets from the video queue 70, the audio queue 72, and the associated data queue 74 over the system bus 51. The processor 52 then distributes the incoming video packets from the video queue 70 to the graphics display subsystem 56 to generate a video image in the video window 40. The processor 52 distributes the incoming audio packets to the audio subsystem 62 to drive the speaker 24. The processor 52 reads the incoming associated data packets from the associated data queue 74 and then performs the video command and control functions specified in the incoming associated data packets.

The address filter 75 contains a data stream address for the computer system 10. The data selector 76 ignores incoming data streams that do not correspond to the data stream address. The data stream address may be written by the processor 52. The data stream address may specify the same address of the data stream or the destination address of the computer system 10 for the data stream.

Figure 4:
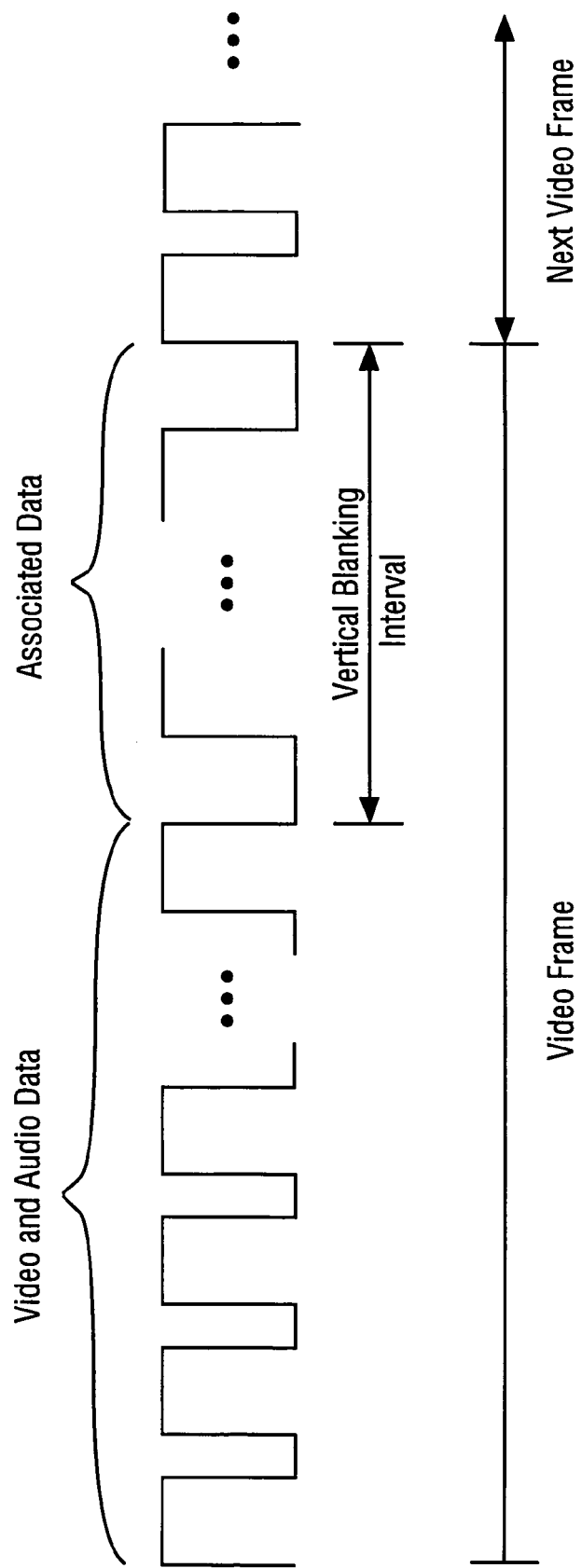
FIG. 4 illustrates a digitized representation of an analog video signal received by the data selector from either the CATV receiver or the television broadcast receiver for one embodiment.

FIG. 4 illustrates a digitized representation of an analog video signal received by the data selector 76 from either the CATV receiver 16 or the television broadcast receiver 18 for one embodiment. The incoming digitized video signal on the communication line 30 comprises a series of video frames. Each video frame comprises a series of scan lines that carries both video and audio information. Each video frame further comprises a vertical blanking interval. The vertical blanking interval carries the associated data that corresponds to the video and audio information for each video frame.

Figure 5:
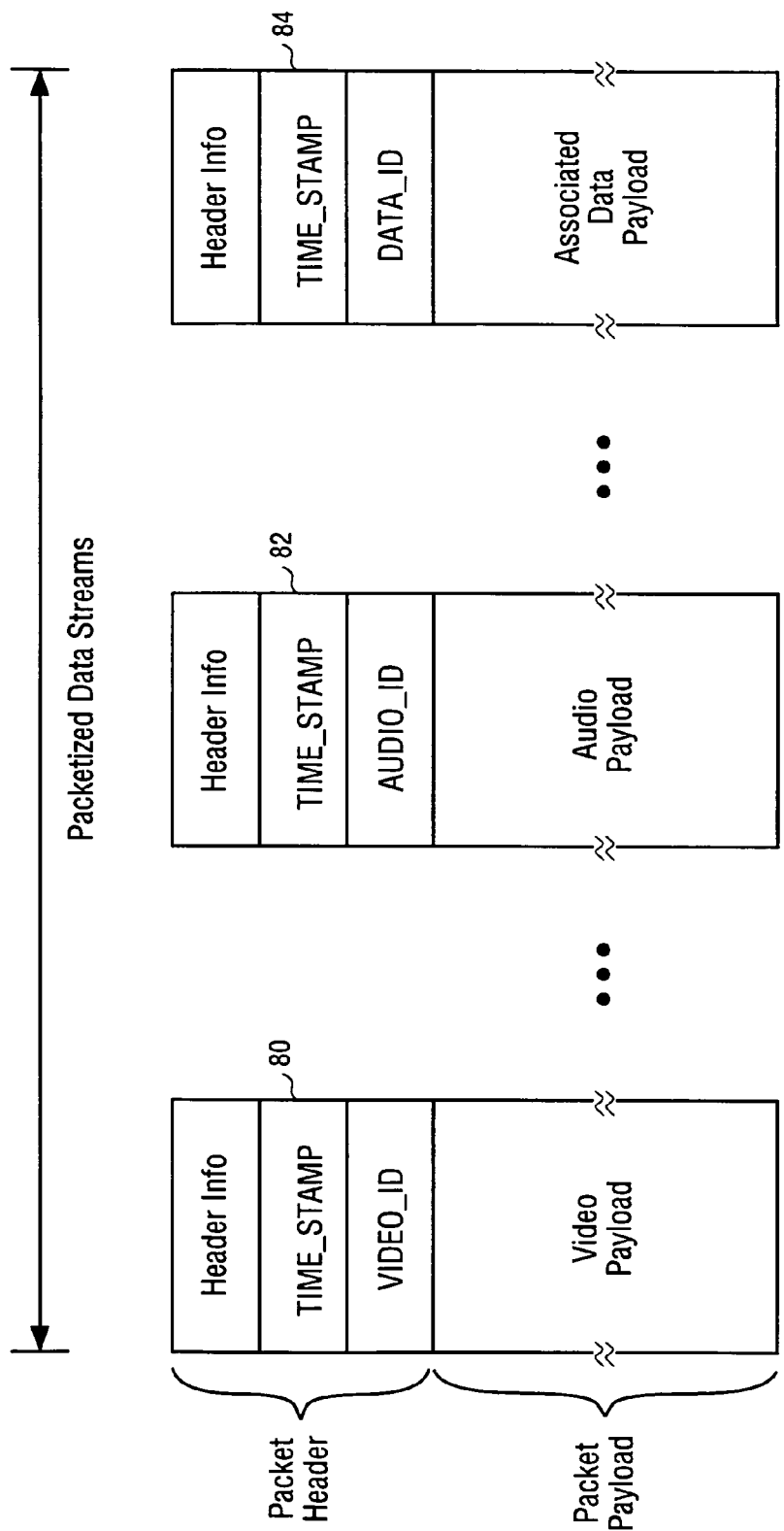
FIG. 5 illustrates a packetized digital data stream received by the data selector for one embodiment which illustrates the format of a video packet, an audio packet, and an associated data packet.

FIG. 5 illustrates the packetized digital data stream received by the data selector 76 over the communication line 30 for one embodiment. The incoming packetized digital data stream on the communication line 30 includes a video packet 80, an audio packet 82, and an associated data packet 84.

The video packet 80, the audio packet 82, and the associated data packet 84 each comprise a packet header and a packet payload. The packet header of the video packet 80, the audio packet 82 and the associated data packet 84 each include a time stamp (TIME_STAMP) that synchronizes the video, audio and associated data carried in the packets 80-84.

The video packet 80 includes a video payload that provides digital video data for display in the video display window 40. The video packet 80 is identified as a packet that carries video data by the video identifier (VIDEO_ID) in the packet header.

The audio packet 82 includes an audio payload for transfer to the audio subsystem 64 to drive the speaker 24. The audio packet 82 is identified as a packet that carries audio data by the audio identifier (AUDIO_ID) in the packet header.

The associated data packet 84 includes an associated data payload that specifies interactive video command and control functions for the computer system 10. The associated data packet 84 is identified as a packet that carries associated data by the associated data identifier (DATA_ID) in the packet header.

For other embodiments, the associated data stream is carried via a chromanance key, a sideband transmission or an audio sub carrier. An embodiment of the command protocol contains commands that perform the following functions:

1) Specify coordinate scale
2) Video screen position and scaling
3) Screen background color
4) Screen background pattern
5) Text
6) Placement region for text (height and width box)
7) Font, size and color for text
8) Graphic/icon for display
9) Display graphic/icon at position with scale
10) Ordering of graphic/text items for layering on the screen
11) Define height and width and position of a selection region
12) Define command to be performed when selection region selected
13) Define color palette Each command is pre-pended with an address and an identifier. The address specifies the address of the receiver (with suitable coding for "all" and sub-groups of possible receivers) and the identifier marks this as a display command (as opposed to other data that is synchronized with the video or audio).

One possible implementation of the above functions is illustrated by the following "object oriented" command set:
Define Object
  Type: Text, Graphic, Icon, Sound, Cursor, Video Window,
    Selection Region, Execution Object, Object List
  Content: <appropriate to object type>
  Attributes: <appropriate to object type: for example, text attributes include font, size, color>
Instantiate Object
  Background: Transparent, solid color, or repeated object (pattern)
  Foreground: Visible/Invisible
  Location: <x,y>
  Size: <x,y>
  Scale: <x,y>

| | |
|---|---|
| Define coordinate scaling | (low x, high x, low y, high y) |
| Define Virtual Screen | (ID, object list) |
| Display Virtual Screen | (ID, on/off) |
| Free Object Instance | (ID list, <all>) |
| Cache Object Instance | (ID list, <all>) |
| Define Instance Order | (ID list) (for overlapping objects) |
| Move Object Instance | (ID, x, y) |
| Copy Object Instance | (ID, new x, new y) |

Figure 6:
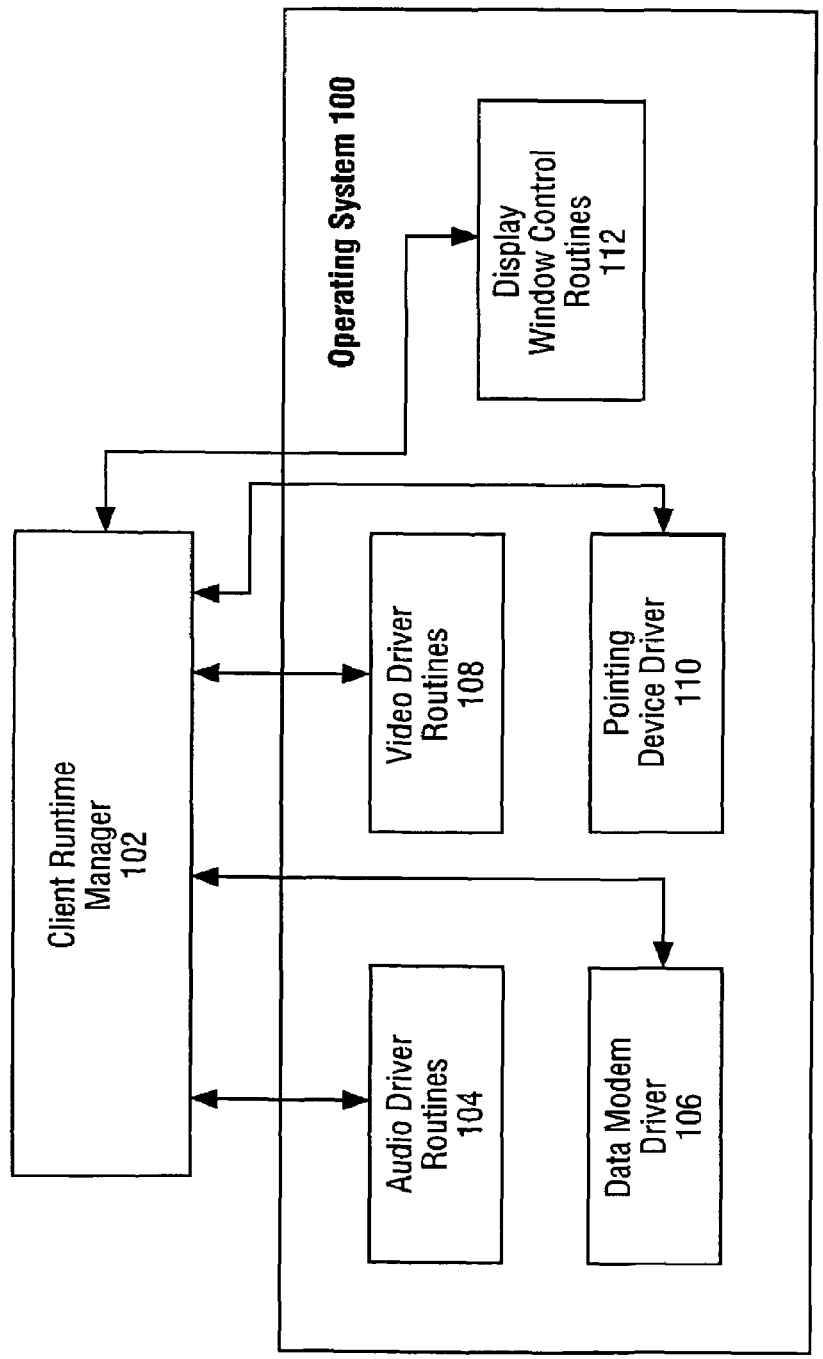
FIG. 6 illustrates the software architecture for the computer system for one embodiment which includes a data stream manager and an operating system.

FIG. 6 illustrates the software architecture for the computer system 10 for one embodiment. The software for the computer system 10 includes a client runtime manager 102 and an operating system 100. The operating system 100 comprises a set of video driver routines 108, a set of audio driver routines 104, a data modem driver 106, a pointing device driver 110, and a set of display window control routines 112.

The client runtime manager 102 reads incoming packets from the video queue 70, the audio queue 72, and the associated data queue 74 using the data modem driver 106. The data modem driver 106 manages the video queue 70, the audio queue 72, or the associated data queue 74 and processes the interrupts on the interrupt line 78 to the processor 52. The client runtime manager 102 distributes the incoming video data from the video queue 70 to the graphics display subsystem 56 using the video driver routines 108. The video driver routines 108 enable the client runtime manager 102 to display the incoming video data stream within the video window 40 on the display surface 50 of the display device 12.

The client runtime manager 102 distributes the incoming audio data from the audio queue 72 to the audio subsystem 62 using the audio driver routines 104. The audio driver routines 104 enable the client runtime manager 102 to drive the speaker 24 with the incoming audio information from the audio queue 72.

The client runtime manager 102 reads the incoming associated data packets from the associated data queue 74 and executes the command and control interactive video functions specified by each associated data packet. The associated data packets are synchronized to the video and audio packets via the TIME_STAMP in each packet header. The associated data packets from the associated data queue 74 include commands that specify the placement of graphic objects on the display device 12. The associated data packets also include commands for placement for graphical windows on the display device 12. The associated data packets also specify graphical objects for rendering on the display device 12.

The associated data packets also specify selection regions for the display surface 50 of the display device 12. In addition, the associated data packets includes commands for execution upon selection of one of the specified selection regions by the mouse pointing device 22. The associated data packets also include commands for the presentation placement and sizing of the video window 40 on the display surface 50.

The display window control routines 112 enable the client runtime manager 102 to define the video display window 40 according to the specifications provided by the associated data packets. The pointing device driver 110 enables the client runtime manager 102 to detect the selection of one of the selection regions defined by the associated data.

Figure 7:
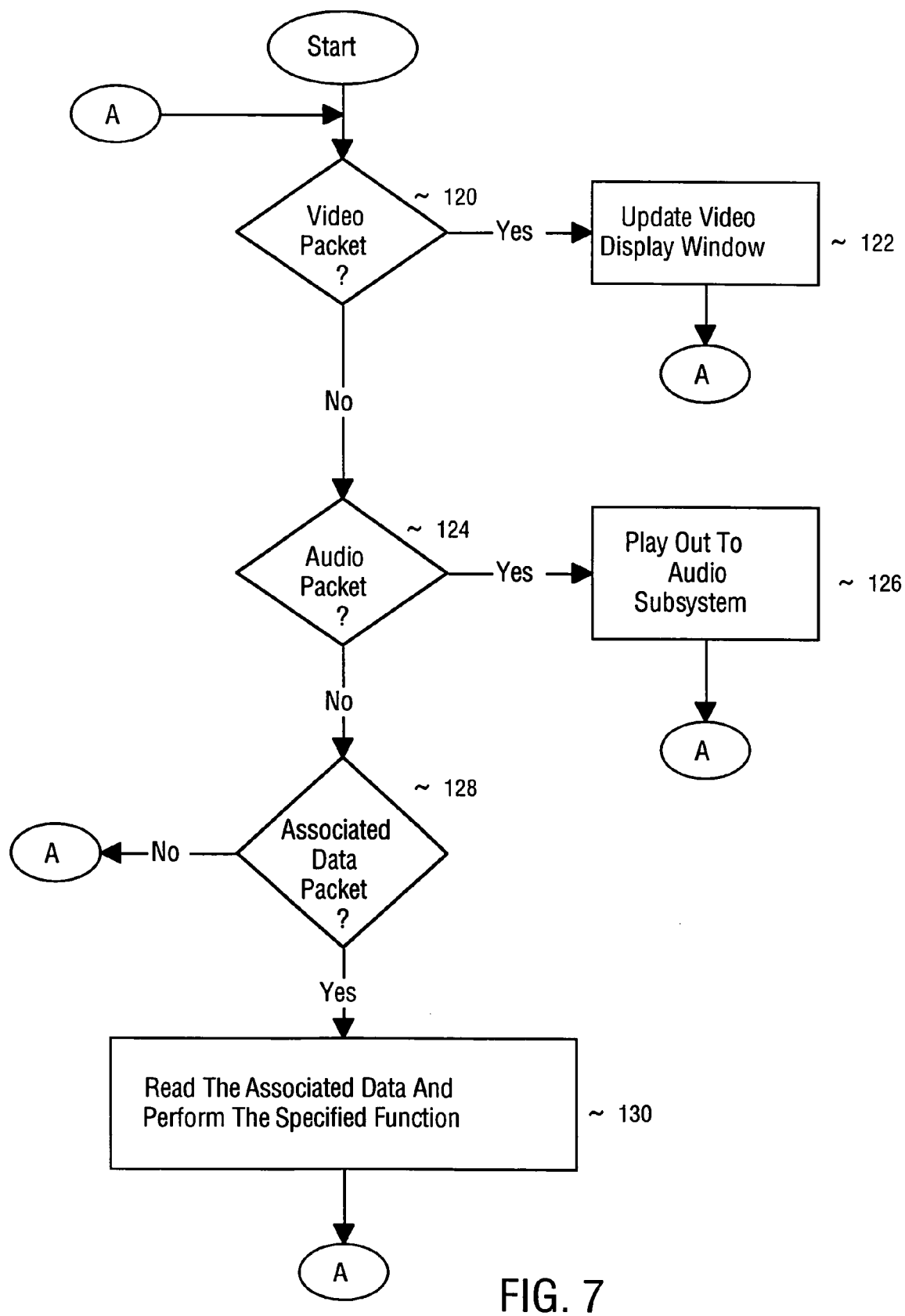
FIG. 7 is a flow diagram illustrating the functions of the data stream manager for one embodiment, wherein the client runtime manager processes the video, audio, and associated data streams to perform interactive video functions.

FIG. 7 is a flow diagram illustrating the functions of the client runtime manager 102 for one embodiment. The client runtime manager 102 is driven by interrupts from the data modem 58 over the system bus 51. At decision block 120, the client runtime manager 102 determines whether an incoming video packet is available from the video queue 70. If an incoming video packet is available at decision block 120 then control proceeds to block 122. At block 122 the client runtime manager 102 updates the content of the video display 40 using the video driver routines 108 to communicate with the graphics display subsystem 56. Thereafter, the client runtime manager 102 waits for another interrupt from the data modem 58.

At decision block 124, the client runtime manager 102 determines whether an incoming audio packet is available from the audio queue 72. If an incoming audio packet is available from the audio queue 72 then control proceeds to block 126. At block 126 the client runtime manager 102 invokes the audio driver routines 104 to play out the incoming audio packet to the audio subsystem 62. The client runtime manager 102 transfers the audio packet payload audio data to the audio subsystem 62 to drive the speaker 24. Thereafter, the client runtime manager 102 awaits another interrupt from the data modem 58.

At decision block 128, the client runtime manager 102 determines whether an incoming associated data packet is available in the associated data queue 74. If an associated data packet is not available from the associated data queue 74 then the client runtime manager 102 waits the next interrupt from the data modem 58.

If an associated data packet is available from the associated data queue 74 at decision block 128, then control proceeds to block 130. At block 130, the client runtime manager 102 reads the associated data packet from the associated data queue 74 and performs the interactive command and control functions specified by the incoming associated data packet. Thereafter, the client runtime manager 102 awaits the next interrupt from the data modem 58.

Figure 8:
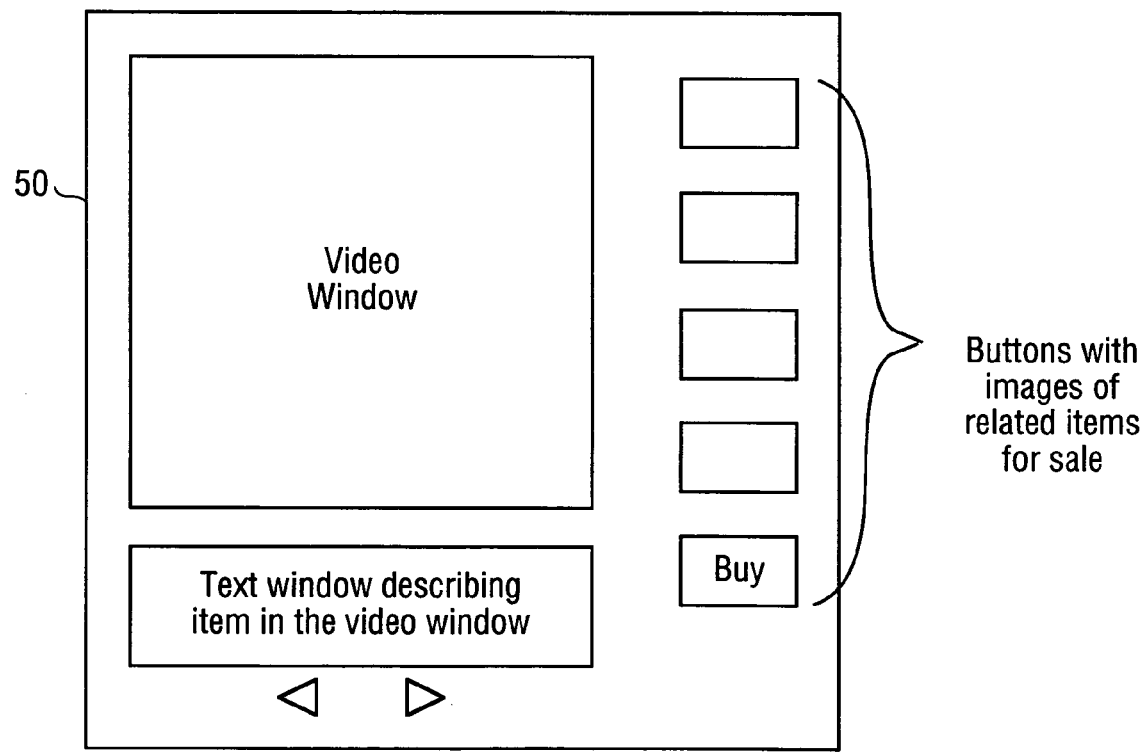
FIG. 8 shows an example video screen that can be created with the technology described herein.

FIG. 8 illustrates an example arrangement of video and display data on the display surface 50 which is generated under content programmer control with the techniques described herein.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A method for providing a video image, comprising:
   receiving a video data stream and an associated data stream corresponding to the video data stream by a computer system;
   utilizing a command protocol that, at least, specify a coordinate scale, support video screen position and scaling, specify background color, specify background pattern, text placement, font size, font color, icon to be used, icon position, layering of graphic images on screen, height and width of selection region, specify a command to be performed when the selection region is selected, and a color palette to be used, wherein each command is prepended with an address and an identifier to specify one or more receivers; and
   displaying the video image defined by the video data stream on a display device of the computer system and performing an interactive command function specified by the associated data stream, wherein the interactive command function comprises a command that specifies a set of parameters that determines an area on a display surface of the display device for placement of a selection window that corresponds to the video image, wherein the interactive command function further comprises a command that specifies an interactive command that is performed if a user selects the selection window.

2. The method of claim 1, wherein the video data stream is received during a series of scan intervals of a video frame and the associated data stream is received during a vertical blanking interval of the video frame.

3. The method of claim 1, wherein the video data stream and the associated data stream each comprise a series of digital communication packets, each digital communication packet having an identifier that indicates the video data stream or the associated data stream.

4. The method of claim 1, wherein the interactive command function comprises a command that specifies a set of parameters that determines an area on a display surface of the display device for placement of a video display window that contains the video image.

5. The method of claim 1, wherein the interactive command function comprises a command that specifies a set of parameters that determines an area on a display surface of the display device for placement of a graphical object that corresponds to the video image.

6. The method of claim 5, wherein the interactive command function comprises a command that specifies a set of pixel data or graphical description commands that correspond to the graphical object.

7. A method, comprising:
   receiving, by a computer system, a video stream and a data stream synchronized to the video stream, the data stream specifying at least one graphical command, wherein the graphical command comprises a command that specifies a set of parameters that determines an area on a display surface of the display device for placement of a selection window that corresponds to the video image, wherein the interactive command function further comprises a command that specifies an interactive command that is performed if a user selects the selection window;
   generating a video scene defined by the data stream onto a portion of a display screen of the computer system;
   performing a graphical operation on the display screen defined by the command; and
   performing an interactive command function specified by the associated data stream, wherein the interactive command function comprises a command that specifies a set of parameters that determines an area on a display surface of the display device for placement of a selection window that corresponds to the video image, wherein the interactive command function further comprises a command that specifies an interactive command that is performed if a user selects the selection window.

8. The method of claim 7, further comprising receiving an audio stream synchronized to the video stream and playing the audio stream through an audio subsystem of the computer system.

9. The method of claim 7, wherein the video stream is coded in a series of video scan intervals of a video signal and the data stream is coded in a series of nonvideo scan intervals of the video signal.

10. The method of claim 7, wherein the data stream specifies a graphical object for display on the display screen.

11. The method of claim 7, wherein the graphical command specifies a color palette for the display screen.

12. The method of claim 7, wherein the graphical command specifies placement of a graphical object on the display screen.

13. The method of claim 7, wherein the graphical command specifies a set of parameters that define selection regions on the display screen.

14. The method of claim 13, wherein the graphical command specifies a selection device for picking the selection regions on the display screen.

15. The method of claim 7, wherein the graphical command specifies text for display on the display screen.

16. The method of claim 15, wherein the graphical command specifies placement and format of the text including font, color, and point size.

17. The method of claim 7, wherein the data stream comprises a series of data packets and wherein the step of receiving a video stream and a data stream synchronized to the video stream includes the step of filtering the data packets according to a destination address of each data packet.

18. The method of claim 7, wherein the data stream comprises a series of data packets and wherein the step of receiving a video stream and a data stream synchronized to the video stream includes the step of filtering the data packets according to a source address of each data packet.

* * * * *